Patented Mar. 9, 1937

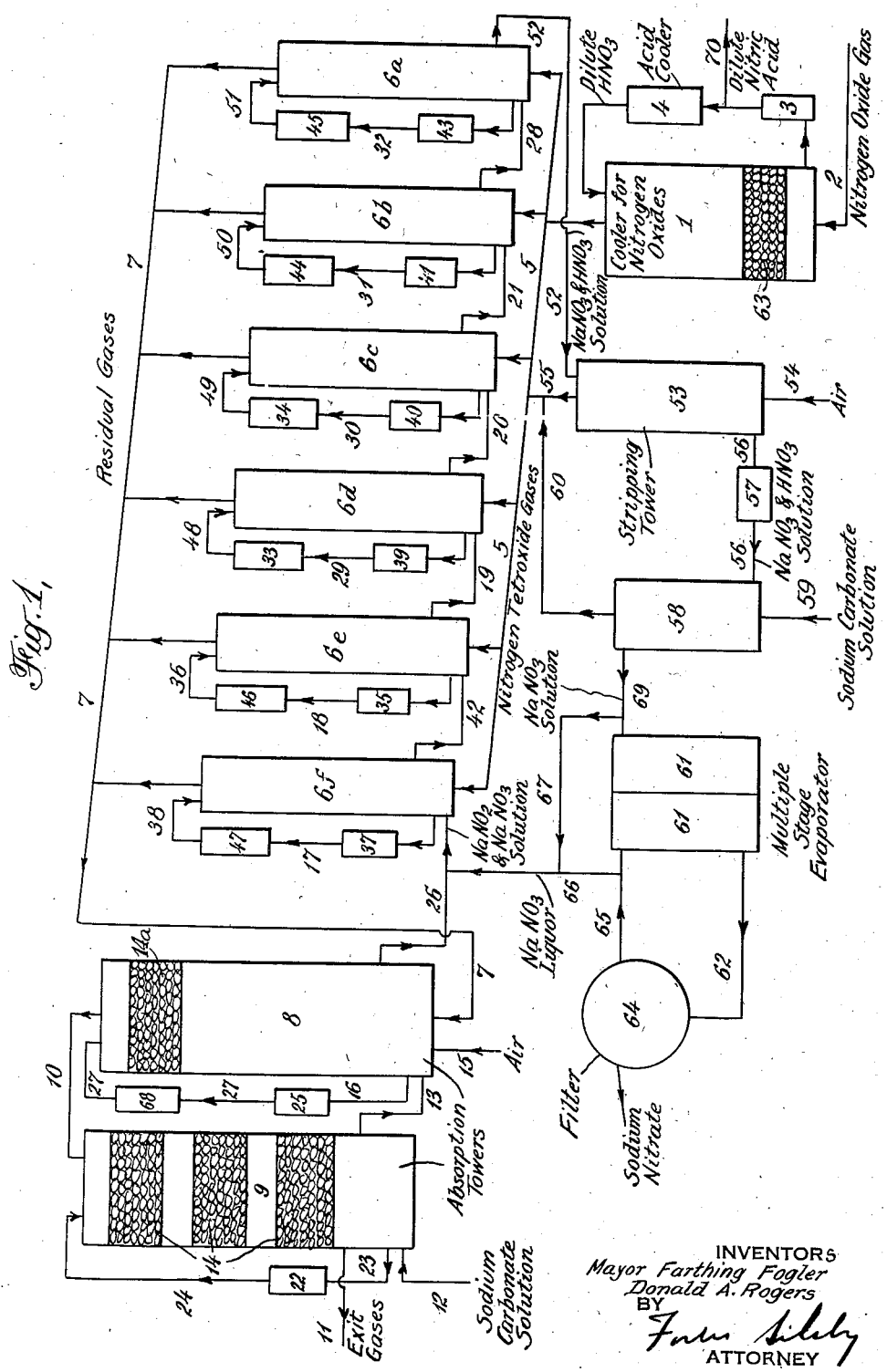

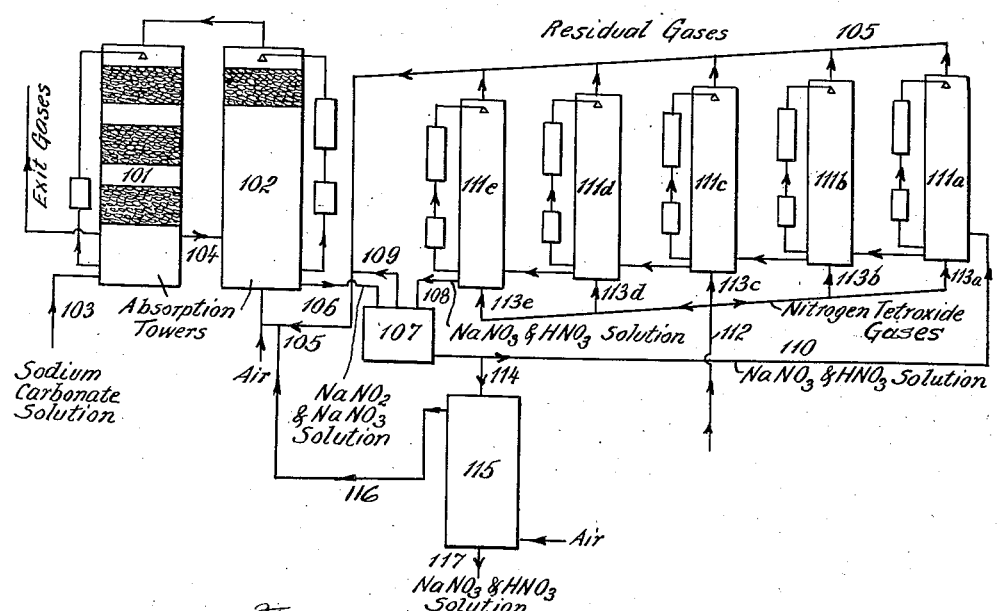
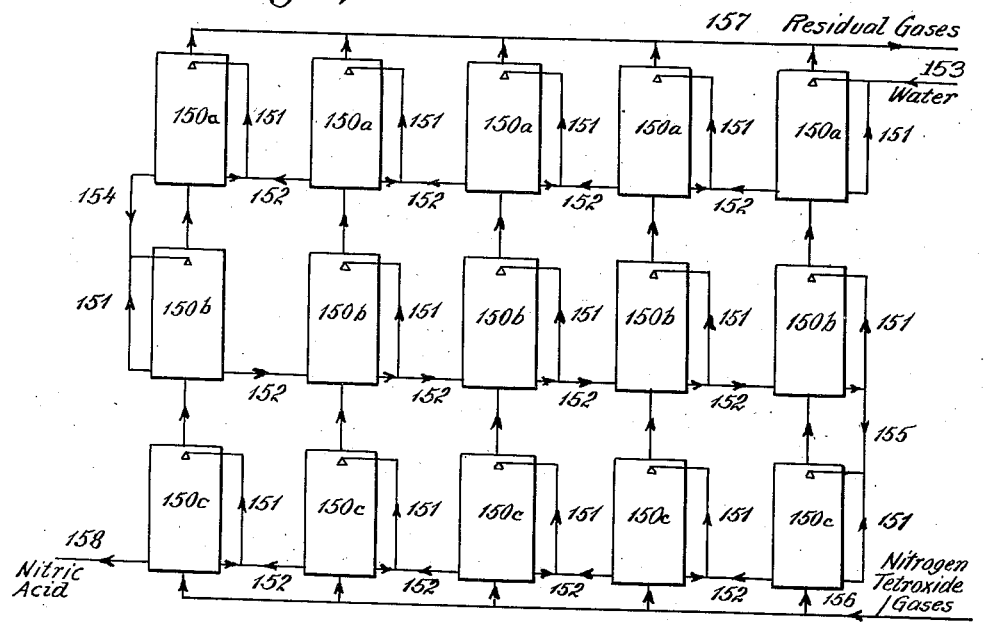

2,072,947

UNITED STATES PATENT OFFICE 2,072,947

PROCESS FOR REACTING NITROGEN TETROXIDE WITH AQUEOUS LIQUIDS

Mayor Farthing Fogler and Donald A. Rogers, Petersburg, Va., assignors, by mesne assignments, to The Solvay Process Company, New York, N. Y., a corporation of New York Application February 23, 1935, Serial No. 7,910
In Canada December 26, 1930

20 Claims. (Cl. 23—102)

This invention relates to a process for reacting a gas containing nitrogen tetroxide (by the term "nitrogen tetroxide" we mean a mixture of $N_2O_4$ and $NO_2$) with an aqueous liquor. More particularly, this invention relates to a process for producing a nitric acid solution from an aqueous liquor such as, for example, water or aqueous solutions of sodium nitrate, or for making relatively concentrated nitric acid solutions from dilute aqueous nitric acid, by treating such liquors with gases containing nitrogen tetroxide. The invention also relates to a process for producing an alkali metal nitrate by treating a solution containing an alkali metal nitrite with gases containing nitrogen tetroxide to convert the nitrite into the corresponding nitrate.

In the manufacture of nitric acid, it has heretofore been proposed to absorb nitrogen tetroxide from gases containing it by passing the gas in contact with water or dilute aqueous nitric acid solution. By reaction of the nitrogen tetroxide with the water, nitric acid and nitric oxide (NO) are formed. By oxidizing the nitric oxide to nitrogen tetroxide and further contacting the tetroxide with water, additional nitric acid may be produced. In carrying out such a process, heretofore, the aqueous liquor and gas have usually been passed in countercurrent flows and in direct contact with each other to promote the absorption and reaction of the nitrogen tetroxide with the water.

It has likewise been proposed to absorb nitrogen oxides in alkaline liquors to form a solution containing both a nitrite and a nitrate and then to oxidize the nitrite content of such solutions by treating them with nitrogen tetroxide or with nitric acid and to absorb the residual gases from such treatment in basic solutions to form a substantially pure nitrite. Such processes result in the production of two products, a nitrite and a nitrate.

It has also been proposed to treat a solution containing both a nitrite and a nitrate with nitrogen tetroxide gases to oxidize the nitrite in a plurality of reaction vessels through which it passes in series, and the nitrogen tetroxide gases are passed in the opposite direction and in series through the several reaction vessels. Oxidation chambers are interposed between each of the vessels in order that the nitric oxide in the gases leaving one vessel may be converted into nitrogen tetroxide before the gases are passed into the succeeding vessel and the residual gases from the last vessel are absorbed in a basic liquor to produce a solution of nitrite-nitrate for treatment in the series of vessels with fresh nitrogen tetroxide gases. Such a process involves the construction of a large and complicated system of apparatus in which each reaction vessel is provided with an oxidation chamber in series therewith. The reaction vessels and oxidation chambers must be constructed sufficiently large to provide for passing all of the gases through each of the vessels and chambers. When relatively large quantities of materials are to be reacted together, such an installation is expensive and cumbersome and it is frequently impossible to employ desired materials which are resistant to the highly corrosive liquors and gases in the construction of an apparatus of adequate size. Furthermore, even though such large apparatus is constructed of available materials, its operation entails the use of considerable pressures in order to force a large volume of gas through the reaction vessels in series at the desired speed.

It is an object of this invention to provide a process for the production of nitric acid or of nitrates which may be carried out in apparatus consisting of relatively small units which may be constructed of materials highly resistant to attack by the corrosive gases and liquids.

Further objects of the invention are to provide a process for the production of nitrates which may be carried out in a simple and relatively inexpensive apparatus in which it is not necessary to provide oxidation chambers for each of the reaction vessels and to provide a process which may be carried out continuously and efficiently for substantially complete recovery of the nitrogen oxides in a gas as a single nitrate product without the use of specially prepared nitric acid.

Other objects of the invention will in part be obvious and will in part appear hereinafter.

The invention accordingly comprises the several steps and the relation and order of one or more of such steps with respect to each of the others, all as exemplified in the following detailed disclosure, and the scope of the application of which will be indicated in the claims.

In the practice of this invention an aqueous liquor is treated with a nitrogen tetroxide gas by successively reacting on the liquor in a plurality of reaction zones with a plurality of separate portions of a gas containing nitrogen tetroxide. The residual gases, after the treatment of the aqueous liquor, when merged together and particularly after being subjected to oxidation, may be readily and substantially completely absorbed in an alkaline liquor to form a solution containing a nitrite. By treating this nitrite solution in the manner aforesaid with further quantities of gas containing nitrogen tetroxide and absorbing the residual nitrogen oxides in additional alkaline liquor as aforesaid, a nitrate may be continuously produced. In the process described adequate contact between the gases and liquor may be insured without requiring excessive pressures in order to force the gases through the apparatus. The capacity of an apparatus of given size for the treatment of nitrite solutions to form nitrate or of water or dilute nitric acid solutions to form nitric acid, is also increased due to the average acidity of the liquors undergoing treatment being lower than is the case where the liquor and gas are passed in contact with each other in a single tower or in series through a plurality of towers. In producing nitrates our process is generally applicable for the treatment of alkaline liquors, such as solutions of calcium hydroxide or milk of lime, or from liquors containing basic compounds of the alkali metals, such as sodium or potassium hydroxide or carbonate.

For a fuller understanding of the nature and objects of the invention, reference should be had to the following detailed description taken in connection with the accompanying drawings, Fig. 1 of which illustrates diagrammatically an embodiment of the process of our invention for the manufacture of sodium nitrate; a modification of this process is illustrated in Fig. 2; and in Fig. 3 there is illustrated a procedure for the production of nitric acid in accordance with this invention.

Referring to Fig. 1 of the drawings, the apparatus comprises a combined cooler and oxidation chamber 1 into which hot gases containing nitrogen oxides are passed through pipe 2 from, for example, the heat exchange system of a catalytic ammonia oxidation system, not shown.

A cooling of the gases in chamber 1 is accomplished by direct contact of the gases with dilute nitric acid which is recirculated from the bottom of the chamber through a pump 3 and cooler 4 to the top of the chamber, whence it passes downwardly in direct contact with the gases therein. As the temperature of the gases is lowered, water vapor which is present therein may condense out and a portion of the nitrogen oxides may be absorbed to form additional quantities of dilute nitric acid. By cooling the gas in the manner described, a minimum amount of nitrogen oxides is removed so that the content of nitrogen oxides in the gas from chamber 1 is conserved for the production of nitrate therefrom, as described below. The amount of dilute acid which is recirculated through the cooler and oxidation chamber may be maintained substantially constant by withdrawing through a pipe 70 an amount of acid equivalent to that formed in the chamber. This dilute nitric acid may be employed in any desired manner. For example, it may be neutralized by means of sodium carbonate solution and employed in making up the liquor used for the absorption of the nitrogen oxides as hereinafter described.

Chamber 1 should be constructed of an acid-resistant material, for example chrome iron. The lower portion of the chamber preferably contains a layer of packing material 63 in order to facilitate an intimate contact between the dilute nitric acid and the gases. The upper portion of the chamber, however, is left empty of packing material, and is of a sufficiently large volume so that the gas containing nitrogen oxides, after being cooled in the lower portion of the chamber, to a temperature suitable for the oxidation of lower oxides to nitrogen tetroxide, for example to about 30° C., reacts with oxygen contained therein to convert lower oxides such as nitric oxide into nitrogen tetroxide so that the gas leaving chamber 1 contains a proportion of nitrogen tetroxide suitable for the oxidation of sodium nitrite as described below. A suitable degree of oxidation of the nitrogen oxides is attained when they contain, for example, about 80% or more nitrogen tetroxide. If the gases entering through pipe 2 do not contain a sufficient proportion of oxygen to react with the nitrogen oxides to form nitrogen tetroxide, additional oxygen, preferably in the form of air, may be introduced into chamber 1.

The nitrogen tetroxide gases pass from chamber 1 into a header pipe 5 where they are divided into a plurality of portions and passed to the bottom portion of each of a plurality of oxidation towers 6a, 6b, 6c, 6d, 6e and 6f constructed of acid-resistant material and containing a packing material such as coke. The top portion of each of these towers is connected with a gas header pipe 7 which serves to collect and merge the residual gases from the towers and to conduct them to the bottom of an absorption tower 8. The top of absorption tower 8 communicates with the top of a second absorption tower 9 by way of a pipe 10, and a gas discharge pipe 11 serves to vent the residual unabsorbed gases from absorption tower 9 to the atmosphere or to conduct them for use at any desired place.

Absorption tower 9 is supplied with an alkaline liquor, which is preferably a solution of sodium carbonate (soda ash) containing about 220 grams of sodium carbonate per liter through a pipe 12. The liquor from pipe 12 mixes in the bottom of tower 9 with a body of similar liquor which has been contacted in the tower with gas containing nitrogen oxides and the mixture is circulated through pipe 23, pump 22 and pipe 24 to the top of the tower and flows downwardly therethrough in contact with the gas passing therethrough. A portion of the circulating liquor is passed from the bottom of tower 9 through an overflow pipe 13 to the bottom of tower 8. Here the liquor from tower 9 is mixed with a body of liquor previously withdrawn from tower 9 and treated with gas containing nitrogen oxides in tower 8 and is circulated through pipe 16, pump 25, pipe 27 and a cooler 68 to the top of tower 8, whence the liquor flows downward through the tower in contact with the gas containing nitrogen oxide gas entering from pipe 7. The sodium carbonate solution in absorption towers 8 and 9 absorbs the nitrogen oxides from the gases therein to form a solution of sodium nitrite containing a proportion of sodium nitrate and a small amount of sodium carbonate. It has been found that by controlling the oxidation of the nitrogen oxides which are absorbed in the sodium carbonate so that from 15% to 20% of the total nitrogen content in the liquor from the alkaline absorption towers is in combination as the nitrate, the liquor may be efficiently treated in the oxidation towers for the oxidation of its nitrate content. A higher degree of oxidation may in some instances be found desirable, even up to complete oxidation of the nitrogen oxides to nitrogen tetroxide prior to absorption in the sodium carbonate solution, in which case the liquor leaving tower 8 will contain equal proportions of its nitrogen content as nitrate and as nitrite. An increased degree of oxidation of the gases prior to absorption decreases the proportion of sodium nitrite to sodium nitrate in the liquor passed from the absorption towers to the oxidation towers and hence relieves the load upon the latter towers. Towers 8 and 9 may be constructed of iron. In order to facilitate absorption of the nitrogen oxides, tower 9 contains a packing material 14 (preferably ceramic rings) over which the solution flows and is exposed to thorough contact with the gases. The upper portion of tower 8 is also preferably provided with packing material 14a, but the lower and substantially greater portion of this tower is left empty of any packing material in order to provide a relatively large space for the oxidation of the nitrogen oxides from pipe 7 by means of oxygen contained in the gas or by oxygen supplied to tower 8 by means of a pipe 15, preferably as air. By constructing tower 8 in this way, there is provided an absorption zone in the upper portion and an oxidation zone in the lower portion of the tower. The alkaline liquor flowing through towers 8 and 9 is maintained at a suitable temperature for the absorption of nitrogen oxides, which temperature is preferably below about 40° C.

From the bottom of tower 8 the solution, containing sodium nitrite and sodium nitrate, is passed by way of pipe 26 to the bottom of tower 6f where it is mixed with liquor in the bottom of the tower and the mixture circulated through pump 37, pipe 17, cooler 47 and pipe 38 to the top of tower 6f and thence downwardly through the tower in contact with the nitrogen tetroxide gases passing therethrough. From the bottom of this tower a portion of the solution circulating therethrough is passed to the bottom of tower 6e by way of overflow pipe 42. The liquor in the bottom of tower 6e is circulated from the bottom of the tower to the top and thence downwardly through the tower in contact with the nitrogen tetroxide gas from pipe 5 by means of pump 35, pipe 18, cooler 46 and pipe 36. In like manner, solution from the bottom of towers 6e, 6d, 6c and 6b is passed to the succeeding tower in the series through overflow pipes 19, 20, 21, and 28 respectively, and in each of the towers is recirculated in contact with the gases passed therethrough by means of pumps 39, 40, 41 and 43, pipes 29, 30, 31 and 32, coolers 33, 34, 44 and 45, and pipes 48, 49, 50 and 51 respectively. During the passage of the solution through the series of towers 6f, 6e, 6d, 6c, 6b and 6a, the sodium nitrite content of the same is oxidized by absorption of nitrogen tetroxide gas and a solution consisting substantially of sodium nitrate and nitric acid is withdrawn from the bottom of tower 6a, through pipe 52. In order to insure the complete oxidation of sodium nitrite, the acidity of the liquor is allowed to build up in tower 6a until there is a sufficient excess of nitric acid to insure oxidation of the small amount of sodium nitrite still present in the solution, and preferably to 12 to 20 grams of nitric acid per liter of solution, before the liquor is discharged from the tower. Since the rate of absorption of nitrogen oxides in the sodium nitrate liquor decreases rapidly with an increase in temperature, the liquor flowing through the oxidation towers should be maintained at a suitable temperature, which is preferably below about 40° C. This temperature control is accomplished by a suitable cooling of the liquor during its recirculation through the towers in coolers 47, 46, 33, 34, 44 and 45 by passing the solution in indirect contact with a suitable cooling medium in the coolers. As indicated in the drawings, the towers 9, 8, 6f, 6e, 6d, 6c, 6b and 6a are placed at an elevation with respect to each other, whereby the solution flows from tower to tower through the system by gravity and the rate of flow of solution from one tower to the next in the series through the overflow pipes connecting the towers is controlled by the rate with which tower 9 is supplied with sodium carbonate solution from pipe 12. A prolonged period of contact between the gases passed through each oxidation tower and the solution therein is obtained by repeatedly bringing the solution into reactive contact with the flowing stream of gas passed from pipe 5 through each of the towers.

It has been found in operating a process as described above, employing a nitrogen oxide gas obtained by the oxidation of ammonia, that about 10% of the nitrogen oxides is absorbed from the gas in the cooler and oxidation chamber 1. An amount of nitrogen oxides is absorbed in the absorption towers system which is equivalent to about 85 to 90% of the total oxides in the ammonia oxidation gas. Accordingly, only a relatively small amount of the oxides is absorbed in the oxidation towers to provide the desired nitric acid content of the sodium nitrate solution removed from these towers.

From pipe 52 the sodium nitrate solution, which contains a small amount of absorbed nitrogen oxides, nitrous acid and nitric acid, is passed to the top of a tower 53 where it is treated with air admitted to the bottom of the tower through a pipe 54. The absorbed nitrogen oxides are liberated from the solution and are carried out of tower 53 through pipe 55 and may be mingled with the gases in header pipe 5. Substantially all of the nitrous acid in the solution is likewise decomposed by the treatment with air in tower 53. The solution of sodium nitrate is passed from tower 53 through pipe 56 by means of a pump 57 to a tank 58 where it is mixed with sufficient sodium carbonate solution admitted through pipe 59 to neutralize its content of nitric acid and to form a substantially pure sodium nitrate solution which is withdrawn from tank 58 through pipe 69. The gases liberated by the reaction of nitric acid and sodium carbonate solution in tank 58 may be passed to header pipe 5 by way of pipes 60 and 55. The sodium nitrate solution which is withdrawn through pipe 69 may contain a small amount of sodium nitrite formed by the neutralization of the nitrous acid not decomposed in tower 53. This nitrate solution may be concentrated and the sodium nitrate content recovered by crystallization or the solution may be subjected to any desired treatment.

The recovery from solution of the sodium nitrate is preferably accomplished by evaporating the solution in a multiple effect evaporator 61 (referring to the drawings) to precipitate out solid sodium nitrate. This sodium nitrate as a sludge is passed through a pipe 62 to a filter 64 where the mother liquor is separated from the solid sodium nitrate and returned through pipe 65 to the liquor undergoing concentration in the last effect of evaporator 61. The solid sodium nitrate from filter 64 may be dried in a rotary drier or otherwise treated to put it in marketable condition.

As stated above, the sodium nitrate solution contains some sodium nitrite in solution. It also contains a small amount of sodium carbonate which was undecomposed in the treatment of sodium nitrate solution in neutralizer 58. The concentration of these impurities is increased as the sodium nitrate solution is concentrated in evaporator 61, and to prevent an excessive amount of impurities being present in the solid sodium nitrate product from filter 64, it is preferable to hold the sodium nitrite and sodium carbonate concentration of the liquor passed from the evaporator to the filter within definite limits, depending upon the allowable amount of these impurities which may be left in the sodium nitrate product. This control of impurity content of the product may be accomplished by separating a portion of the mother liquor returning through pipe 65 to the last effect of evaporator 61 and returning this separated portion of mother liquor by way of a pipe 66 to pipe 26 where it mixes with the sodium nitrite solution on its way to oxidation tower 6f. Thus, by bleeding mother liquor from pipe 65 at such a rate that it contains the same weight of sodium nitrite and sodium carbonate per unit of time as is introduced into the evaporators by the solution passed thereto through pipe 69, the concentration of the impurities in the liquor going to the filter from the evaporator is maintained constant and the amount of impurities in the sodium nitrate product from the filter is controlled. This returned liquor, which is a saturated sodium nitrate liquor, is diluted with solution from pipe 69 by withdrawing a portion of the solution passing therethrough by way of pipe 67 and introducing it into the liquor passing through pipe 66. By thus diluting the liquor, precipitation of the sodium nitrate by cooling of the liquor in the pipe 66 may be prevented.

It is, of course, apparent that the control of the impurity content of the sodium nitrate product may be similarly accomplished by returning a sufficient quantity of the mother liquor from the last effect of the evaporator to the oxidation towers. It will be seen in either case that the control of the impurity content of the solid product is accomplished by returning a portion of evaporated nitrate solution to the oxidation towers where it is subsequently treated with a gas containing nitrogen tetroxide. Instead of introducing the returned liquor into the sodium nitrite solution on its way to tower 6f, the liquor may be introduced into the solution passing into another of the series of oxidation towers. By treatment of the returned liquor with nitrogen tetroxide, the sodium nitrite content of the same is oxidized to sodium nitrate and the sodium carbonate content is decomposed and transformed into sodium nitrate. This feature of the process of returning mother liquor to the liquor undergoing treatment with nitrogen tetroxide, makes it possible to control the impurity content of the sodium nitrate produced in a simple and efficient manner without loss of material and without requiring the use of supplemental apparatus for purification of the product.

Referring to Fig. 2, there is illustrated an apparatus for the production of sodium nitrate which comprises two absorption towers 101 and 102, the first of which is supplied with sodium carbonate solution through a pipe 103 and from tower 101 the liquor treated therein advances through pipe 104 to tower 102. These two towers are provided with packing material, liquid recirculation pumps and pipe lines, coolers for the recirculating liquid, and gas inlet and outlet pipes similar to the corresponding accessories of towers 9 and 8 of Fig. 1 and described above. The operation of these towers 101 and 102 in treating the sodium carbonate solution with a nitrogen oxide gas introduced from pipe 105 is like that described above for towers 9 and 8 of Fig. 1.

The solution containing sodium nitrite and nitrate leaving tower 102 through pipe 106 is passed into a reaction vessel 107 where it is mixed with a solution of nitric acid introduced from pipe 108. The nitric acid reacts with the sodium nitrite in the solution to form sodium nitrate with the evolution of nitric oxide (NO) which passes from vessel 107 through pipes 109 and 105 into tower 102 for oxidation and absorption in the sodium carbonate solution. An excess of nitric acid is used over the stoichiometric quantity required for reaction with the nitrite present in the solution to facilitate the decomposition of the nitrite.

The sodium nitrate solution from vessel 107 is in part passed through pipe 110 to the series of towers 111a, 111b, 111c, 111d and 111e where it is used for absorption of nitrogen tetroxide from a gas from pipe 112 to form the nitric acid for treating additional sodium nitrite solution in vessel 107 in the manner described above. The sodium nitrate solution from pipe 110 advances in series through towers 111a, 111b, 111c, 111d and 111e, in each of which the solution is recirculated into contact with separate streams of gas containing nitrogen tetroxide from pipe 112 which is divided into five portions, one of which is passed through each of pipes 113a, 113b, 113c, 113d and 113e to and through the respective towers 111a, 111b, 111c, 111d or 111e with which these pipes communicate. This nitrogen tetroxide gas may correspond in composition and temperature to the gas passed through pipe 5 of Fig. 1 as described above. Nitric acid is formed by absorption and reaction of the nitrogen tetroxide with the water in the sodium nitrate solution, the concentration of nitric acid increasing as the solution advances through the series of towers. The solution of sodium nitrate and nitric acid thus produced is passed from tower 111e through pipe 108 into vessel 107 to be mixed with sodium nitrite solution coming from tower 102. The unabsorbed gases leaving towers 111a, 111b, 111c, 111d and 111e are merged in pipe 105 and passed through towers 102 and 101 for oxidation and absorption of the nitrogen oxides in these gases to form the solution containing nitrite.

A portion of the acidic sodium nitrate solution from vessel 107 is withdrawn through pipe 114 and passed into a tower 115 in which it is heated and treated with air to free it of dissolved nitrogen oxides and nitrous acid (which decomposes to form NO and $NO_2$). The gas leaving tower 115 is conducted through pipe 116 and introduced into the gases passing through pipe 105 for recovery of the nitrogen oxides by absorption in the sodium carbonate solution in towers 102 and 101. The purified sodium nitrate solution drawn from tower 115 through a pipe 117 may then be neutralized and evaporated for recovery of its sodium nitrate as described above for the treatment of the solution drawn from stripping tower 53 of Fig. 1.

Referring now to Fig. 3, there is illustrated a procedure for the production of nitric acid employing the process of this invention. The apparatus illustrated diagrammatically consists of fifteen absorption towers designated as 150a, 150b or 150c. Each of these towers is provided with a packing material and with means not shown for repeated recirculating liquid through the tower through a pipe 151 and for cooling the liquid passing through this pipe. Groups of five towers are provided with pipes 152 through which liquid treated in one tower advances to the next tower of the group. Water is introduced from a pipe 153 into the first tower of the group of towers 150a, advances through each of the towers of this series and from the last tower 150a is passed through a pipe 154 to the first tower of the group of towers 150b. After advancing in series through this group of towers, the liquid leaving the last tower 150b passes to the first of towers 150c through a pipe 155 and advances in series through the group of towers 150c. It will thus be seen that the water introduced from pipe 153 passes in series through the five towers of each of the three groups designated by 150a, 150b and 150c.

A nitrogen tetroxide gas, for example a gas obtained by oxidation of ammonia which has been cooled and oxidized as described above for the treatment of the gas passed into towers 6a, 6b, 6c, 6d, 6e and 6f of Fig. 1, is passed through a pipe 156 and divided into five separate portions, each of which is passed as a separate stream of gas through one of a plurality of towers or reaction zones 150c through which the water containing nitric acid from pipe 155 advances in series. Similarly, each of towers 150b or 150a is one of a plurality of towers or reaction zones through which water passes in series and through which portions of nitrogen tetroxide gas are passed as separate streams of gas, each stream being passed through one of a plurality of towers in the group 150b or 150a. The residual gas is merged in a pipe 157 and may be passed in contact with sodium carbonate or other alkaline solution for absorption and recovery of the nitrogen oxides in the gas.

In thus contacting the water and nitrogen tetroxide gas in towers 150a, 150b and 150c, nitrogen tetroxide is absorbed and reacts with the water to form nitric oxide and nitric acid which is withdrawn from the last tower through a pipe 158. The nitric oxide may be oxidized by free oxygen in the gas to form additional nitrogen tetroxide which is absorbed during the passage of the gas through the towers. The water entering the first of the towers 150a may already contain nitric acid. For example, in utilizing the gases obtained from ammonia oxidation, these gases may be cooled to condense water therefrom as described above for the treatment of such a gas in cooler 1 of Fig. 1. The dilute nitric acid withdrawn through pipe 70 of that Fig. 1 may be introduced into the series of towers of Fig. 3 to be used for the absorption of nitrogen tetroxide and the production of a relatively concentrated nitric acid product.

Instead of maintaining each of the five portions of nitrogen tetroxide as a separate stream of gas each of which is passed in series through three towers, the several gas streams leaving towers 150c may be merged and this merged gas again divided into five portions, one each of which is passed through one of towers 150b. Similarly, the gas streams leaving towers 150b may be merged and again divided into separate portions which then pass through towers 150a. In thus operating the characteristics of the process remain unchanged with respect to its involving the features of passing a liquid in series through a plurality of towers or stages (150a, 150b or 150c) through each of which a separate stream of nitrogen tetroxide gas is passed in contact with the liquid.

It will thus be seen that the process of this invention as described in the above examples, broadly comprises the successive treatment of an aqueous liquid such as a water or a dilute nitric acid solution, or an aqueous solution containing a nitrite, with separate portions or streams of a gas containing nitrogen tetroxide to absorb nitrogen tetroxide to oxidize the nitrite to nitrate in an acidic solution or to produce a solution of free nitric acid. The residual gases may then be merged and absorbed in an alkaline solution whereby a solution of a nitrite is obtained which, in like manner, may be treated with nitrogen tetroxide to oxidize the nitrite. The process as utilized for the production of a nitrate, therefore, may comprise continuously passing an alkaline solution through a plurality of towers countercurrent to nitrogen oxide gases, in which towers the solution is contacted in series with the gases for absorption of nitrogen oxides to form a solution of a nitrite and this solution then is passed in series through a plurality of towers in contact with a plurality of separate streams of the fresh gases containing nitrogen oxides (i. e. gases which have not previously passed in contact with the nitrite solution) passed through the several towers in parallel for oxidation of the nitrite to nitrate. The alkaline solution is thus continuously and efficiently converted into a solution of the corresponding nitrate. By appropriate treatments of this solution, the nitrate may be recovered as a solid.

The process of this invention is particularly suitable for the treatment of large volumes of gas, since by dividing the gas into a number of portions which are separately contacted with the liquid towers of relatively small cross sectional area may be employed. Further, as pointed out above the average acidity of the liquid treated with the gas in the several towers employed in carrying out this invention is relatively low as compared with a process in which both the gas and the liquid are passed in contact with each other in a single tower or are passed in series through several absorption towers. This low average acidity of the liquid results in an enhanced efficiency in the reaction of the nitrogen tetroxide with the liquid and, as a result, there is a marked saving in the total tower volume required for the production of a given quantity of nitrate or nitric acid using the process of this invention.

It is apparent, of course, that numerous modifications and changes may be made in the particular processes described above and illustrated in the accompanying drawings. For example, while we have shown the use of six towers for the conversion of sodium nitrite to sodium nitrate and two towers for the absorption of the residual nitrogen oxides in a sodium carbonate solution, a greater or lesser number of towers may be employed in either or both groups. In the process as described, the sodium carbonate solution and the gases containing nitrogen oxides are contacted in tower 9 in concurrent flow. By passing the gases from tower 8 into the bottom of tower 9, however, and withdrawing the exit gases from the top of this tower, the gas and solution may, if desired, be contacted in this tower in countercurrent flow. Instead of employing a single apparatus both for the cooling and the oxidation of the gases containing nitrogen oxides, these two steps may be carried out in separate apparatus, or if gases of a proper composition and temperature are available, they may be passed directly into contact with the sodium nitrite solution.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

This application is a continuation in part of our copending application Serial No. 424,592, filed January 30, 1930.

We claim:

1. The process for reacting nitrogen tetroxide with an aqueous liquid which comprises passing said liquid in succession through a plurality of reaction zones in each of which the liquid is passed in contact with one of a plurality of streams of gas containing nitrogen tetroxide, said streams of gas being passed in parallel through said reaction zones.

2. The process for reacting nitrogen tetroxide with an aqueous liquid which comprises passing said liquid in succession through a plurality of reaction zones in each of which the liquid is passed in contact with one of a plurality of streams of gas containing nitrogen tetroxide, said streams of gas being passed in parallel through said reaction zones, and in each of the reaction zones recycling the liquid into repeated contacts with the stream of gas passing therethrough.

3. The process for reacting nitrogen tetroxide with water to form nitric acid which comprises passing said water in succession through a plurality of reaction zones in each of which the water is passed in contact with one of a plurality of streams of gas containing nitrogen tetroxide, said streams of gas being passed in parallel through said reaction zones, and in each of the reaction zones recycling the water into repeated contacts with the stream of gas passing therethrough.

4. The process for reacting nitrogen tetroxide with water to form nitric acid which comprises passing said water in series through a plurality of towers through each of which the water is repeatedly circulated, passing each of a plurality of portions of gas containing nitrogen tetroxide as a separate gas stream through a group comprising a plurality of said towers in each of which one of said portions of gas is passed in contact with the water circulated therethrough separate from the portion of gas passing through another tower of said group and passing the gas leaving said group of towers through another group comprising a plurality of said towers as a plurality of streams of gas each of which is separately passed in contact with the water in a tower of said last mentioned group different from a tower through which another of said streams is passed.

5. In a process of producing a solid nitrate which comprises the oxidation of a nitrite in solution by treating it with a gas containing nitrogen tetroxide, evaporating the resulting nitrate solution containing impurities, recovering solid nitrate from the evaporated solution and returning the mother liquor to another portion of nitrate solution for evaporation therewith, that improvement which comprises controlling the nitrite content of the solid nitrate by separating a portion of the evaporated nitrate solution and mixing it with nitrite solution which is subsequently treated with a gas containing nitrogen tetroxide.

6. In a process of producing solid sodium nitrate which comprises the oxidation of sodium nitrite in solution by treating it with a gas containing nitrogen tetroxide, neutralizing the resulting solution with sodium carbonate whereby a solution of sodium nitrate containing sodium carbonate and sodium nitrite as impurities is obtained, evaporating the sodium nitrate solution to form solid sodium nitrate, recovering said solid sodium nitrate from the evaporated solution and returning the mother liquor to another portion of sodium nitrate solution for evaporation therewith, that improvement which comprises controlling the impurity content of the solid sodium nitrate by mixing a portion of the evaporated sodium nitrate solution with sodium nitrite solution which is subsequently treated with a gas containing nitrogen tetroxide.

7. A process for the production of a nitrate which comprises repeatedly bring a solution of a nitrite into reactive contact with a flowing stream of a gas containing nitrogen tetroxide, withdrawing a portion of said solution, and repeatedly bringing said withdrawn portion into reactive contact with a second flowing stream of gas containing nitrogen tetroxide separate from the first mentioned stream of gas.

8. A process for the production of a nitrate which comprises oxidizing a nitrite in solution by successively passing said nitrite solution through a plurality of reaction zones in each of which the solution is passed in contact with one of a plurality of streams of gas containing nitrogen tetroxide, said streams of gas being passed in parallel through said reaction zones.

9. A process for the production of a nitrate which comprises oxidizing a nitrite in solution by successively passing said nitrite solution through a plurality of reaction zones in each of which the solution is passed in contact with one of a plurality of streams of gas containing nitrogen tetroxide, said streams of gas being passed in parallel through said reaction zones, and in each of said reaction zones recycling the nitrite solution undergoing treatment into repeated contact with the stream of said gas passing therethrough.

10. A process for the production of a nitrate which comprises oxidizing a nitrite in solution by successively passing said nitrite solution through a plurality of reaction zones in each of which the solution is passed in contact with one of a plurality of streams of gas containing nitrogen tetroxide, said streams of gas being passed in parallel through said reaction zones, merging the residual gases containing nitrogen oxides unabsorbed by the nitrite solution, absorbing the nitrogen oxides in said residual gases in an alkaline liquor, and oxidizing the nitrite content of the resulting solution in the manner described for the aforesaid solution.

11. A process for the production of a nitrate which comprises oxidizing a nitrite in solution by successively passing said nitrite solution through a plurality of reaction zones in each of which the solution is passed in contact with one of a plurality of streams of gas containing nitrogen tetroxide, said streams of gas being passed in parallel through said reaction zones, and in each of said reaction zones recycling the nitrite solution undergoing treatment into repeated contact with the stream of said gas passing therethrough, and continuing the aforesaid treatment of the nitrite solution with nitrogen tetroxide gas until the solution in the last of said reaction zones with respect to the passage of the solution through the several reaction zones contains about 12 to 20 grams of nitric acid per liter.

12. A process for the production of sodium nitrate which comprises oxidizing sodium nitrite in solution by successively passing said sodium nitrite solution through a plurality of reaction zones in each of which the solution is passed in contact with one of a plurality of streams of gas containing nitrogen tetroxide, said streams of gas being passed in parallel through said reaction zones.

13. A process for the production of sodium nitrate which comprises oxidizing sodium nitrite in solution by successively passing said sodium nitrite solution through a plurality of reaction zones in each of which the solution is passed in contact with one of a plurality of streams of gas containing nitrogen tetroxide, said streams of gas being passed in parallel through said reaction zones, and in each of said reaction zones recycling the sodium nitrite solution undergoing treatment into repeated contact with the stream of said gas passing therethrough.

14. A process for the production of sodium nitrate which comprises absorbing nitrogen oxides in a solution of sodium carbonate to form a solution containing sodium nitrite, oxidizing the nitrite content of the resulting solution by successively passing said solution through a plurality of reaction zones in each of which the solution is passed in contact with one of a plurality of streams of gas containing nitrogen tetroxide, said streams of gas being passed in parallel through said reaction zones, merging the residual gases containing nitrogen oxides unabsorbed by the nitrite solution, absorbing the nitrogen oxides in said residual gases in a solution of sodium carbonate and oxidizing the sodium nitrite content of the resulting solution in the manner described for the first mentioned solution.

15. A process for the production of sodium nitrate which comprises absorbing nitrogen oxides in a solution of sodium carbonate to form a solution containing sodium nitrite, oxidizing the nitrite content of the resulting solution by successively passing said solution through a plurality of reaction zones in each of which the solution is passed in contact with one of a plurality of streams of gas containing nitrogen tetroxide, said streams of gas being passed in parallel through said reaction zones, continuing the treatment of the solution with said gas until said solution contains about 12 to 20 grams of nitric acid per liter of solution, merging the residual gases, subjecting the nitrogen oxides contained therein to oxidation, absorbing the nitrogen oxides in a solution of sodium carbonate to form a solution containing sodium nitrite, and converting the nitrite into nitrate by treatment of the solution in a plurality of reaction zones with gas containing nitrogen tetroxide as herein described.

16. A process for the production of sodium nitrate which comprises absorbing nitrogen oxides in a solution of sodium carbonate to form a solution containing sodium nitrite, oxidizing the nitrite content of the resulting solution by successively passing said solution through a plurality of reaction zones in each of which the solution is passed in contact with one of a plurality of streams of gas containing nitrogen tetroxide, said streams of gas being passed in parallel through said reaction zones, and in each of said reaction zones recycling the nitrite solution undergoing treatment into repeated contact with the stream of said gas passing therethrough, continuing the treatment of the solution with said gas until said solution contains about 12 to 20 grams of nitric acid per liter of solution, merging the residual gases, subjecting the nitrogen oxides contained therein to oxidation, absorbing the nitrogen oxides in a solution of sodium carbonate to form a solution containing sodium nitrite, and converting the nitrite into nitrate by treatment of the solution in a plurality of reaction zones with gas containing nitrogen tetroxide as herein described.

17. A process for the production of sodium nitrate which comprises absorbing nitrogen oxides in a solution of sodium carbonate to form a solution containing sodium nitrite, repeatedly bringing said nitrite solution in one stage of liquid-gas treatment into reactive contact with a flowing stream of a gas containing nitrogen tetroxide, withdrawing a portion of said solution from the aforesaid stage, repeatedly bringing said withdrawn portion into reactive contact in another stage of liquid-gas treatment with a second flowing steram of gas containing nitrogen tetroxide separate from the first mentioned stream of gas, merging the residual gases from both the aforesaid streams of gas, absorbing the nitrogen oxides contained therein which were unabsorbed by the nitrite solution in a solution of sodium carbonate, and treating the resulting solution with gas containing nitrogen tetroxide in the manner hereinbefore described.

18. The process for the production of a nitrate which comprises passing a gas containing nitrogen oxides in contact with an aqueous alkaline liquor to form a solution containing a nitrite, mixing the solution of nitrite with a solution containing nitric acid and a nitrate to decompose the nitrite and form an aqueous solution of nitrate, passing at least a portion of said nitrate solution successively through a plurality of reaction zones in each of which the solution is passed in contact with one of a plurality of streams of gas containing nitrogen tetroxide to form nitric acid for the decomposition of additional quantities of nitrite, said streams of gas being passed in parallel through said reaction zones.

19. The process for the production of nitrate which comprises continuously passing an aqueous solution of said nitrate through a plurality of reaction zones in each of which the solution is passed in contact with one of a plurality of streams of gas containing nitrogen tetroxide to form a solution containing a nitrate and nitric acid, said streams of gas being passed in parallel through said reaction zones, and the aqueous solution being recycled in each reaction zone into repeated contacts with the stream of gas passing therethrough, passing the gas thus contacted with nitrate solution into contact with an aqueous alkaline liquor to absorb nitrogen oxides in the gas and form a solution containing a nitrite, mixing the aforesaid solution containing a nitrate and nitric acid with the solution containing nitrite to convert the nitrite into nitrate, and circulating a portion of the resulting aqueous nitrate solution into contact with the aforesaid gas containing nitrogen tetroxide for the production of said nitric acid.

20. A process for reacting nitrogen tetroxide with an aqueous liquid which comprises repeatedly bringing said liquid into reactive contact with a flowing stream of a gas containing nitrogen tetroxide, withdrawing a portion of said liquid, and repeatedly bringing said withdrawn portion into reactive contact with a second flowing stream of gas containing nitrogen tetroxide separate from the first mentioned stream of gas.

MAYOR FARTHING FOGLER.
DONALD A. ROGERS.